United States Patent [19]
Ralston

[11] 3,877,817
[45] Apr. 15, 1975

[54] TEMPERATURE STABILIZED PHOTOMETER FOR KINETIC ANALYSIS

[76] Inventor: Wilson Ralston, 99 Prospect St., Stamford, Conn. 06901

[22] Filed: July 2, 1973

[21] Appl. No.: 375,419

[52] U.S. Cl.............. 356/180; 23/253 R; 250/238; 250/239; 356/96; 356/184
[51] Int. Cl............................ G01j 3/46; G01j 3/42
[58] Field of Search ....... 356/180, 96, 97, 103, 104, 356/184, 186, 188, 189, 159; 250/238, 239; 23/253 R

[56] References Cited
UNITED STATES PATENTS

| | | | |
|---|---|---|---|
| 1,971,317 | 8/1934 | Sheldon et al. | 356/195 |
| 2,193,437 | 3/1940 | Summerson | 356/180 |
| 2,424,858 | 7/1947 | Senn | 356/186 |
| 2,447,985 | 8/1948 | Mass | 356/184 |
| 3,327,126 | 6/1967 | Shannon et al. | 250/238 |
| 3,593,568 | 7/1971 | Schmitz et al. | 356/39 |
| 3,748,044 | 7/1973 | Liston | 356/180 |

*Primary Examiner*—Vincent P. McGraw
*Attorney, Agent, or Firm*—Kaufman & Kramer

[57] ABSTRACT

A temperature stabilized photometric instrument is provided comprising an instrumentation housing including a body having a wall segment and a light permeable passage formed in the segment, a photometric light source positioned outside of the housing and arranged for projecting a light beam through the passage to the interior of the housing, means for supporting a translucent vessel containing sample material for analysis in the path of the light beam within the interior of the housing and photodetecting means positioned within the housing for receiving light which is transmitted by the vessel and for providing an electrical signal representative of an optical characteristic of the sample material. The instrumentation housing is formed of a material exhibiting a relatively high thermal conductivity and is thermally insulated. A thermally diffusive structure is positioned between the sample vessel and photodetectors for reducing transient temperature changes accompanying a newly introduced sample. Proportional heat control means are provided for maintaining the temperature of the housing at a predetermined value.

17 Claims, 8 Drawing Figures

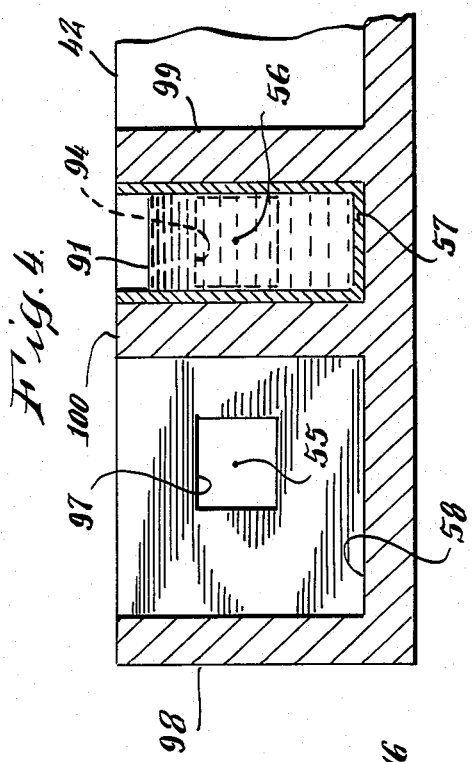
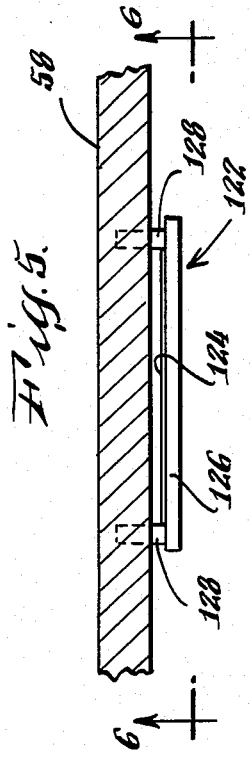
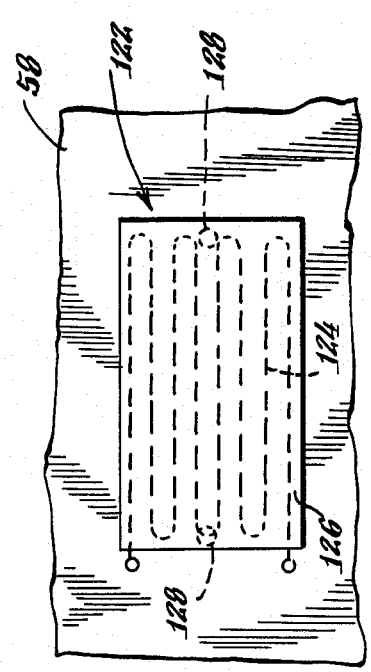
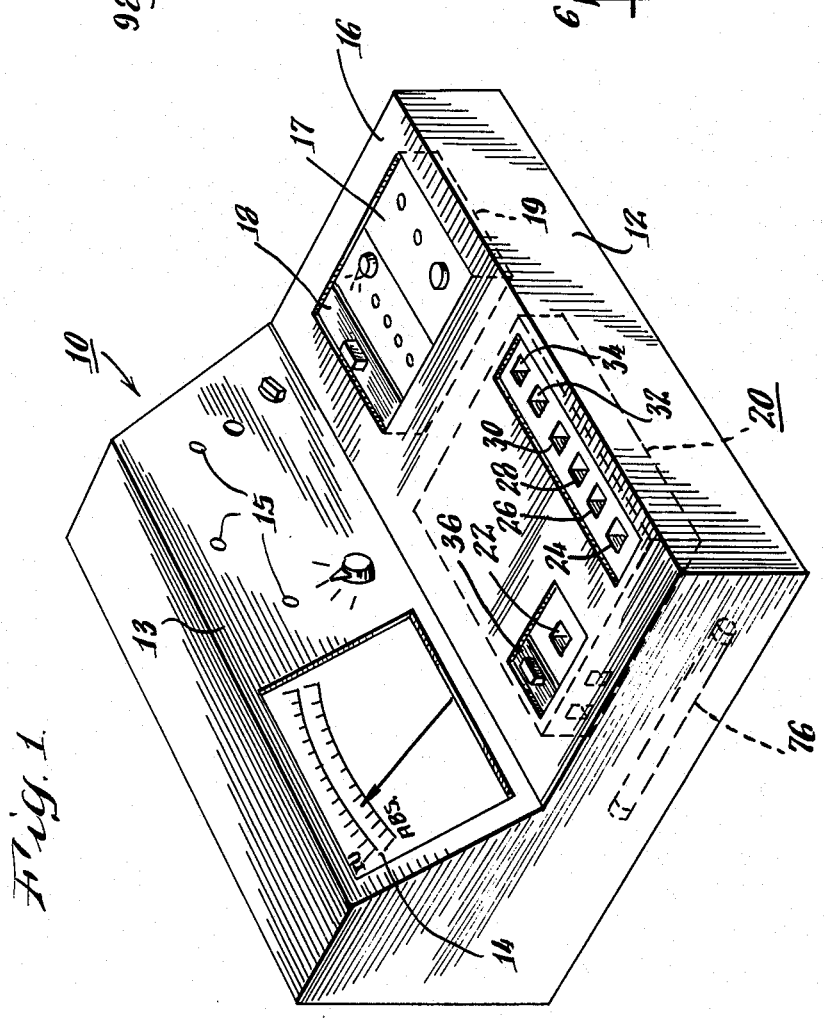

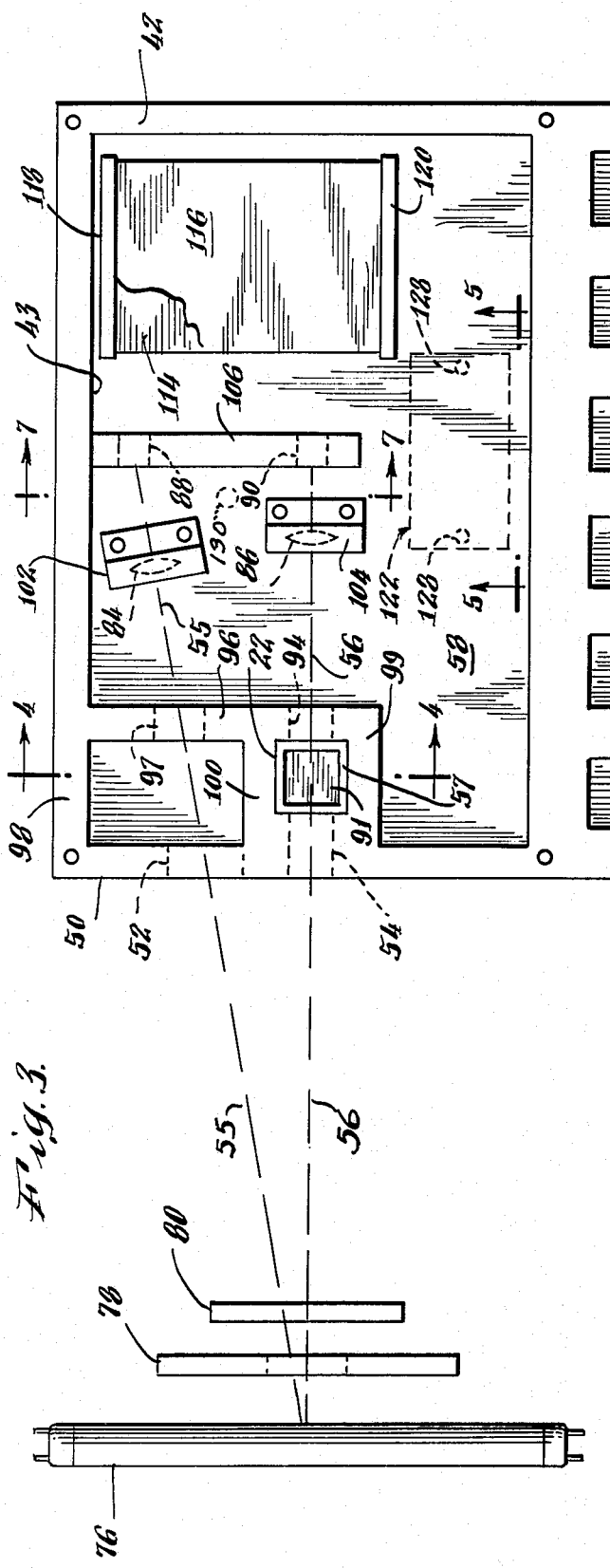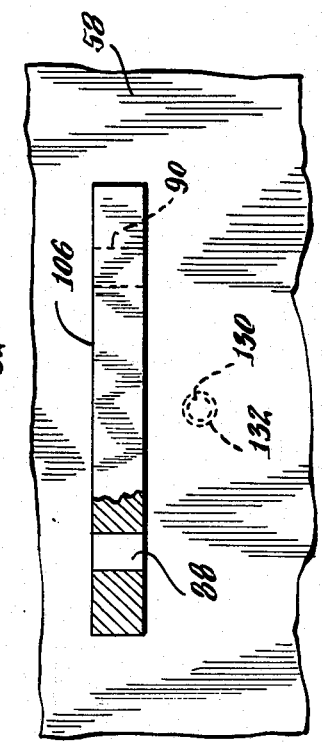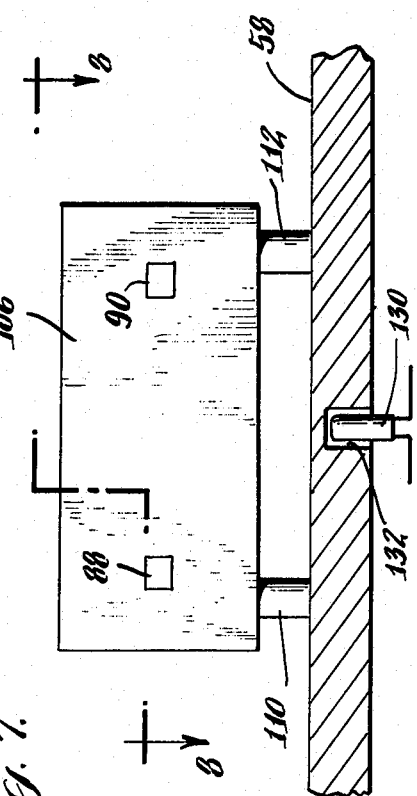

TEMPERATURE STABILIZED PHOTOMETER FOR KINETIC ANALYSIS

This invention relates to photometric apparatus. The invention relates more particularly to improvements in a photometric apparatus which enhance the sensitivity, accuracy, and repeatability of analysis.

In a known photometric analysis technique, a light beam is projected toward a cell containing a quantity of sample material under investigation. An indication of the presence or absence of a component in the sample is provided by causing a reaction of the composition and by detecting an accompanying variation in an optical characteristic of the composition as the reaction progresses. For example, in one form of photometric instrument, light from the source is projected along a measuring path and through a sample composition undergoing reaction as well as along a reference path. Electrical signals representative of the intensity of the light projected along each path are generated and are combined in a manner for providing a resultant signal which is representative of the absorbance of the sample composition. The absorbance signal is then applied to a recording means such as a chart recorder for display and permanent recording.

The temperature stability of a photometric instrument during a measurement is relatively important. Sensitivity, repeatability and accuracy of measurement are instrument characteristics which are generally temperature dependent. For example, in various chemical reactions, such as an enzyme catalyzed reaction, the rate of reaction can vary as much as 10% per degree Centigrade. Thus, relatively small variations in the temperature of the sample can result in significant changes in the rate of reaction and are to inaccurate output indications. In addition, photometric instruments employ photosensitive elements which function as light intensity detectors. The sensitivity of instrument measurements is principally dependent upon the sensitivity of the photodetector. However, photodetectors generally exhibit a temperature characteristic whereby the sensitivity and/or the dark current of the photodetector will vary significantly with relatively small changes in the temperature. This contributes to variations in the output indication. Also, temperature fluctuation caused by convection air currents is a source of noise when detecting low light levels.

In practice, the light source, the sample vessel and the photodetectors are generally located in relatively close proximity in order to provide efficient utilization of light and to reduce interference from external sources. However, the light source comprises a device which dissipates a significant amount of electrical energy in the form of heat. This source of heat is located in relatively close proximity to the temperature sensitive photodetector elements and because of variations occurring in lamp operating characteristics which are accompanied by convection currents within the apparatus, the temperature of both the sample cell and the photodetector and in certain instances, logarithm taking circuit arrangements are undesirably subject to variation. The temperature stability of the instrument is thereby disadvantageously affected.

Accordingly, it is an object of this invention to provide an improved form of photometric apparatus.

Another object of the invention is to provide an improved form of photometric clinical or analytical instrument.

Another object of the invention is to provide a photometric apparatus having improved temperature stability characteristics.

Another object of the invention is to provide a photometric apparatus wherein the temperature of a sample vessel is maintained at a substantially constant predetermined temperature during a sample analysis.

Another object of the invention is to provide a photometric apparatus including photodetector means and having means for maintaining the photodetector means at a substantially constant temperature during a sample analysis.

A further object of the invention is to provide a photometric instrument arrangement wherein heat dissipated by a light source is substantially ineffective in altering the temperature characteristics of a sample vessel or photodetector means.

Another object of the invention is to provide a constant temperature environment for temperature sensitive electronic components such as logarithm-taking elements in an absorbance measuring photometer.

In accordance with features of this invention, a temperature stabilized photometric instrument is provided comprising an instrumentation housing including a body having a wall segment and a light permeable passage formed in the segment, a photometric light source positioned outside of said housing and arranged for projecting a light beam through said passage to the interior of said housing, means for supporting a translucent vessel containing sample material for analysis in the path of the light beam within the interior of said housing and photodetection means positioned within the housing for receiving light which is transmitted by or reflected from said vessel and for providing an electrical signal representative of an optical characteristic of said sample material.

In accordance with more particular features of the invention, the instrumentation housing is formed of a material exhibiting a relatively high thermal conductivity and is thermally insulated. Proportional heat control means are provided for maintaining the temperature of the housing at a predetermined value.

In accordance with other more particular features of the invention, the photometric instrument includes thermally diffusive means positioned between the sample vessel and the photodetecting means for reducing temperature transients at the detector which accompany or result from the introduction of the sample vessel into the interior of the housing. A sample vessel preheating means is provided and includes a plurality of compartments which are formed integrally with the instrumentation housing for preheating the sample vessel prior to its introduction into the measuring compartment.

These and other objects and features of the invention will become apparent with reference to the following specification and to the drawings wherein:

FIG. 1 is a perspective view of a photometric instrument constructed in accordance with features of this invention;

FIG. 3 is a plan view of the portion of the instrument illustrated in FIG. 2;

Figure 2:
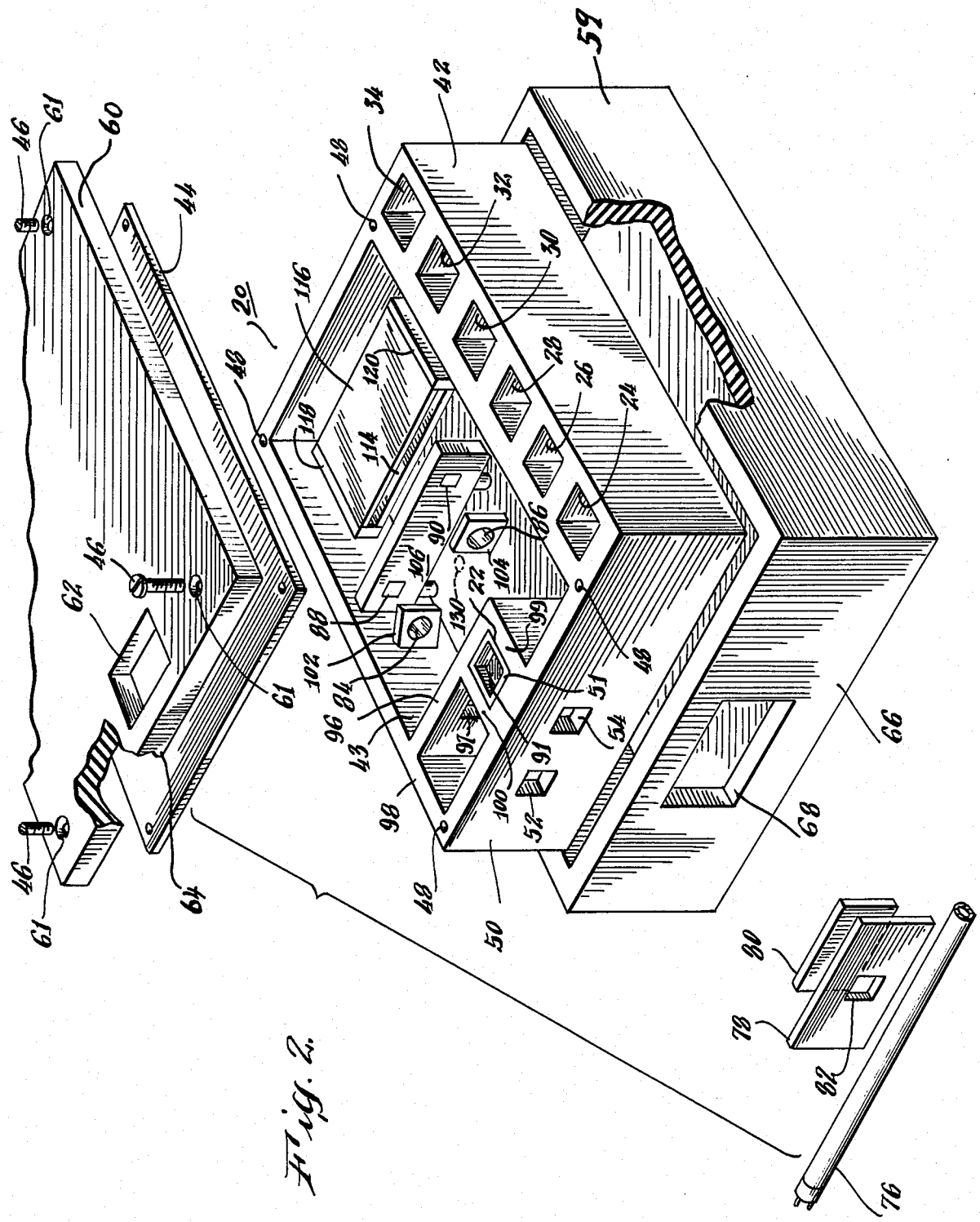
FIG. 2 is an exploded view of portions of the photometric instrument of FIG. 1.

FIG. 4 is a view taken along lines 4—4 of FIG. 3;
FIG. 5 is a view taken along lines 5—5 of FIG. 3;
FIG. 6 is a view taken along lines 6—6 of FIG. 5;
FIG. 7 is a view taken along lines 7—7 of FIG. 3; and,
FIG. 8 is a view taken along lines 8—8 of FIG. 7.

Referring now to FIG. 1, a clinical instrument 10 is illustrated which comprises a double beam absorbance photometer for measuring and indicating changes in the absorbance of a sample material under investigation. While an enzyme analysis clinical instrument will be described, the invention is not limited thereto, and it will become apparent that the invention is equally applicable to other types of photometers such as a single beam photometer, to other forms of clinical instruments which perform chemical analyses by means of sample florescence or by nephelometery and to other forms of instruments such as analytical instruments. In addition, the invention is applicable to a sample flow-through system wherein the sample is conveyed to a flow-through cuvette that is placed in the sample well. The photometer of FIG. 1 includes a sheet metal enclosure 12 having a display and control panel 13 to which is mounted a meter 14 for indicating absorbance and the rate of reaction in International Units (I.U.) as measured during the analysis by the instrument.

There is also mounted to the panel 13 various controls and indicators referenced generally as 15 and including an instrument range control switch, an analysis start switch, a power-on switch, and instrument status light indicators. A horizontal panel 16 of the enclosure has mounted thereon a meter zeroing control, a switch for selecting one of three predetermined operating temperatures for the instrument, various calibrating adjustments, and electrical terminals for providing output absorbance and rate-of-reaction signals. These components are referenced generally as 17. A sliding cover 18 which is mounted to the panel 16 is provided. The cover 18 shown in its retracted position exposes the calibrating adjustments and the temperature selecting means. A portion of the instrument electrical circuit means comprising circuit means for a proportional temperature control and auxiliary circuit means employed with the apparatus are referenced generally as 19 and are mounted within the enclosure 12. Other circuit means are mounted within a temperature controlled instrumentation housing which is discussed hereinafter. The purpose and operation of these controls and the associated electrical circuitry is described in my copending U.S. patent application, Ser. No. 375,418 which is filed concurrently herewith.

A temperature regulated environment comprising an instrumentation housing 20 is provided and is positioned within the enclosure 12. The instrumentation housing 20, which is described in greater detail hereinafter, includes a body having a measuring compartment 22 and a plurality of preheating compartments 24–34. During the operation of the instrument, a sample vessel containing a sample which is to be analyzed is initially positioned in one of the preheating compartments 24–34. After it has preheated to a predetermined operating temperature, such as 37°C., the vessel is then removed and is transferred to the measuring compartment 22. Access to the measuring compartment 22 is provided by a cover 36 which is mounted to the panel 16 of the enclosure 12 and which is retractable for exposing this compartment.

The instrumentation housing 20 as illustrated in greater detail in FIGS. 2 and 3 includes a compartmentized body member 42 which is separated by wall segments into an instrumentation compartment 43, the measuring compartment 22 and the plurality of preheating or incubating compartments 24–34, referred to hereinbefore. A housing cover member comprising a plate 44 is provided for the instrumentation compartment and is secured to the body member 42 by screws 46 which engage threaded holes 48 which are formed in this body. A wall segment 50 of the body member 42 includes electromagnetic radiation or light permeable passages comprising apertures 52 and 54 formed therein which permit the projection of reference and measuring light beams 55 and 56 respectively (FIG. 3) therethrough to the interior of the instrumentation housing. The measuring compartment 22 and the preheating compartments 24–34 are integrally formed with the body 42 and are arranged for receiving an electromagnetic radiation permeable or translucent vessel comprising, for example, a rectangular-shaped glass cuvette 57 (FIG. 4) which contains a sample for analysis. While the compartments 22–34 are shown to comprise generally rectangular-shaped wells having a depth which extends from the upper surface of the body 42 to a lower surface 58 thereof, other suitable configurations such as circular bores for receiving tubular-shaped sample containers may also be utilized.

A layer of thermal insulating material is formed about the outer surface of the instrument housing. The layer comprises a box member 59 and a cover member 60. The cover member 60 extends coextensively with the housing cover plate 44 and is secured to the housing by the screws 46 which also extend through apertures 61 formed in the insulating cover member 60. A window 62 which is formed in the cover member 60 is also aligned with a window member 64 formed in the housing cover plate 44 and with the measuring compartment 22. Similarly, a wall segment 66 of the box member 59 includes an electromagnetic radiation or light permeable passage comprising an aperture 68 which extends through the thickness of the wall segment 66 and which is aligned with the apertures 52 and 54 of the housing wall segment 50. The aperture 68 provides a transmission path for the reference and measuring light beams which are projected through this wall segment and through the apertures 52 and 54 into the interior housing 20.

The instrumentation housing 20 effectively provides a thermal guard which shields components positioned within the measuring compartment 22 and the instrumentation compartment 43 from external temperature transients and thereby substantially reduces temperature variations within the instrumentation compartment and within the preheating and measuring compartments. In addition, and as described in detail hereinafter, the contents of the instrumentation housing are uniformly heated by closely coupling a proportionally controlled heater means to the body. Further, the insulating layer about the instrumentation housing reduces heat losses from the housing and shields the housing from external thermal transients. The housing is formed of a material having a relatively high coefficient of thermal conductivity, K. Various materials include aluminum, copper and brass may be utilized. Aluminum is preferred because of its relatively low cost and light weight. It is desirable that the material from which the housing is fabricated have a coefficient of thermal conductivity, K, which is greater than about 0.1 cal-cm/sec-cm$^2$-C°. The housing members are relatively thick-bodied and have a wall thickness or cross section which is commensurate with the material utilized and the area and volume of the instrumentation housing. For a particular material, larger areas require correspondingly greater wall thicknesses. Various materials may be employed for providing an insulating layer about the housing. A preferred material comprises polyurethane. In a particular embodiment of the invention not deemed limiting in any respects, the instrumentation housing is formed of cast aluminum having a wall thickness of about ½ inch and having outside dimensions of about 6 inches in length, 5 inches in width, and 2 inches in height. The insulating layer is formed of polyurethane having a wall thickness of about ½ inch.

A source of electromagnetic radiation comprising a light source for the instrument is provided and is positioned without the instrument housing 20. The light source is adapted for projecting the measuring light beam 56 and the reference light beam 55 into the interior of the housing. The light source includes an elongated ultraviolet fluorescent lamp 76, an optical stop 78, and an interference filter 80. Light beams from the lamp 76 are projected through an aperture 82 which is formed in the optical stop 78, through the filter 80 and into the housing. Means comprising lenses 84 and 86 are positioned within the instrumentation compartment 43 for focusing the light beams at photodetector means 88 and 90 respectively. The interference filter 80 transmits a predetermined wavelength of light or a band of wavelengths of light in accordance with the purposes of the physical analysis. An interference filter for a number of enzyme analyses, for example, is selected to transmit light at 340 nm. Other interference light filters may be substituted therefor. The thermal separation of this light source from the measuring compartment 22 and from the temperature-sensitive photodetector means 88 and 90 by the insulated housing 20 substantially enhances the temperature stability of the instrument.

The measuring light beam 56 (FIG. 3) which is projected into the instrumentation compartment 43 traverses a radiation permeable aperture 68 in the insulating box 59 and the radiation permeable aperture 54 in the wall segment 50 of the housing body 42. The beam 56 thus transmitted impinges upon a sample maerial 91 contained in the sample vessel 57 which is positioned in the measuring compartment 22 (FIG. 4). Light components of the measuring beam 56 which are transmitted by the material 91 under analysis traverses an aperture 94 which is formed in an interior wall 96 of the measuring compartment. The lens 86 focuses this beam on the photodetector 90. The reference light beam 55 (FIG. 3) similarly traverses the apertures 68 and 52 and an aperture 97 which is formed in the interior wall 96 and which is aligned with the apertures 68 and 54. This beam is focused on the photodetector 88 by the lens 84. Alternatively, a reference or calibration material may be contained in a vessel and positioned within a compartment, not illustrated, in the path of the reference light beam 55. Also, a flow-through type vessel may be positioned within the compartment.

The interior wall 96 is integrally formed with the housing 20 and extends from the compartment 22 to a side wall segment 98 of the housing. A segment of the interior wall 96 along with other integrally formed wall segments 99 and 100 and the lower surface 58 of the housing form the measurement compartment 22. The interior wall members 96, 99 and 100 operate as a thermal diffusion barrier and shield the temperature sensitive photodetector elements from the effects of any thermal transfer which may occur as the sample vessel 57 containing the material 91 under analysis is initially introduced into the measuring compartment 22.

The lenses 84 and 86 are mounted on brackets 102 and 104 respectively within the instrumentation compartment 43. These brackets are formed of metal and are screw-mounted to the bottom surface 58 of the housing 20. This mounting arrangement advantageously provides for a relatively close thermal coupling between these lenses and the housing 20 thereby providing relatively stable optical characteristics for these elements. The lens 86 is positioned within the housing for focusing light emitted from the aperture 94 on the detector 90 while the lens 84 is positioned for focusing light emitted from the aperture 97 in the wall segment 96 on the reference photodetector 88.

The photodetector elements 88 and 90 may comprise various sensitive photodetectors such as photodiodes, phototransistors, photo field effect transistors and photoresistors. The photodetector elements generate electrical signals which are proportional to the intensity of the light flux impinging thereon and which is representative of an optical characteristic of a material under analysis. For example, the signal may be representative of the absorbance of the material. The photodetector elements are mounted on a bracket 106 which is formed of a material having a relatively high coefficient of thermal conductivity. The bracket 106 (FIG. 7) is mounted to the lower surface 58 of the housing 20 by insulating spacers 110 and 112 which are formed of a plastic material having relatively high thermal insulating characteristics. This mounting arrangement provides relatively close thermal coupling between the elements and results in a photodetector operation having thermal common mode rejection. Circuit means which arae mounted on circuit boards 114 and 116 are provided for combining the signals from the photodetectors and for providing a resultant absorbance signal and a signal which is representative of the rate of change of the absorbance signal. These signals are applied to the meter 14 (FIG. 1) for visual display and to the output terminals referred to hereinbefore on panel 16 of the enclosure 12. The circuit boards 114 and 116 are supported on the lower surface 58 of the compartment 43 by brackets 118 and 120.

As indicated hereinbefore, a means for regulating the temperature of the housing 20 is provided and comprises a heater means, a temperature sensor, and a circuit means for proportionally controlling the housing temperature. The proportional control comprises a known circuit arrangement for establishing a set-point temperature which senses temperature deviation from the set-point and energizes the heating means in order to reestablish the set-point temperature. The heating means comprises a heater element 122 which is mounted in close thermal contact with the bottom of surface 58 of the instrumentation compartment 43 and is located forward of the photodetector support bracket 106. The heater element comprises an elongated heater wire 124 formed of nichrome for example which is embedded in an electrically insulating, thermally conductive body 126 and which is secured to the bottom of surface 58 by screwmounting means 128. A temperature sensing means comprises a thermistor 130 (FIG. 7) which is positioned within a bore 132 formed in the surface 58 of the housing member 42. The thermistor 130 is secured in the bore by suitable means such as by adhesive. The bore 132 is laterally located an equal distance from the detector elements 88 and 90. A known form of circuit means is provided for establishing a temperature set-point and for energizing the heater element 124 in order to reestablish the set-point temperature. This circuit means is positioned within the enclosure 12 (FIG. 1) and is referenced generally as 19. The proportional temperature control thus described provides for relatively close regulation of the temperature of the instrumentation housing 20 to an order of 0.01°C of the set-point temperature. This proportional temperature regulation and the insulated instrumentation housing of high thermal conductivity provides for a highly stable operating temperature.

The prewarming or incubating compartments 24–34 are integrally formed in the body member 42 and are thus maintained at substantially the same temperature as the measuring compartment 22. A sample vessel 57 may then be positioned within one of these preheating compartments for an interval of time sufficient for the vessel to attain the desired operating temperature. The vessel is then transported to the measuring compartment 22 and any thermal transfer which may accompany the movement and introduction of the vessel into the measuring compartment is substantially shielded from the photodetection means by the diffusive thermal barrier formed by the interior walls 96, 99 and 100.

There has thus been described an improved photometric instrument which is advantageous in that it provides a relatively high degree of temperature stability. The separation of the heat dissipating light source and the temperature sensitive elements by the use of a thermal barrier comprising an instrumentation housing of high thermal conductivity surrounded by an insulating material results in the isolation of the temperature sensitive photodetection elements and the sample under analysis from the heat source. This heat source in combination with convection currents existing in the instrument has heretofore caused significant variations in temperataure within the instrument. The employment of an instrumentation compartment and the use of a proportional heating control means having a heating element in intimate contact with the instrumentation housing provides for a relatively close temperature regulation at a predetermined temperature. The further use of a thermal diffusive barrier of relatively high thermal conductivity shields the temperature sensitive detector elements from temperature variations which can occur when a sample vessel is introduced into the measuring compartment. The instrument sensitivity, repeatability, and accuracy are thereby enhanced.

While I have described particular embodiments of my invention, it will be apparent that various modifications may be made thereto by those skilled in the art without departing from the spirit of the invention and the scope of the appended claims.

What is claimed is:

1. A temperature stabilized photometric instrument for kinetic analysis comprising:
    means providing an instrumentation housing,
    said housing means including a body formed of a thermally diffusive material having a wall segment and a light permeable passage formed in said wall segment;
    a photometric light source positioned outside of said instrumentation housing and arranged for projecting a light beam through said passage to the interior of said housing;
    means for receiving and supporting a translucent vessel containing a sample material for analysis in the path of said light beam within said housing;
    photodetection means positioned within said housing body for receiving light which is transmitted from said vessel and for providing an electrical signal representative of an optical characteristic of said sample material; and,
    thermally diffusive means positioned between said sample vessel and said photodetection means for diffusing thermal energy and for reducing transient temperature changes at said detector means upon the introduction of a sample vessel into said sample receiving means.

2. The instrument of claim 1 wherein said thermally diffusive means is arranged for separating the interior of the housing body into an instrumentation compartment and a measurement compartment.

3. The instrument of claim 1 wherein said housing body is formed of a material having a coefficient of thermal conductivity greater than about 0.1 calorie - centimeter/second - centimeter$^2$ - centigrade degree.

4. The instrument of claim 3 wherein said housing body is formed of cast aluminum.

5. The instrument of claim 4 wherein said housing body is thick walled and has a relatively large thermal capacity.

6. The instrument of claim 3 including heat control means for establishing the temperature of said housing at a predetermined temperature and for automatically supplying heat to said housing for maintaining said established temperature.

7. The instrument of claim 6 wherein said heat control means comprises a proportional controller and includes temperature sensing means and a heating element mounted in close thermal coupling with said housing.

8. The instrument of claim 7 including first and second photodetector means mounted on a body formed of a material which exhibits relatively high thermal conductivity, said body for mounting said photodetectors mounted within said housing body positioned adjacent an inner surface of said housing so as to cause said first and second photodetectors to exhibit thermal common mode rejection of temperature disturbances.

9. The instrument of claim 8 wherein said temperature sensing element is mounted within the thickness of said housing body and is spaced a substantially equal distance from said photodetectors.

10. The instrument of claim 1 wherein said thermally diffusive material is integrally formed as an interior wall member within said housing body.

11. The instrument of claim 10 wherein said integrally formed interior wall member includes a light permeable passage for transmitting light which impinges upon said sample vessel through said measurement compartment to said detector means.

12. The instrument of claim 1 wherein said housing body includes a plurality of prewarming compartments for receiving sample vessels which are to be prewarmed prior to introduction into said translucent vessel receiving and supporting means, and thermally diffusive means positioned between said compartments and said photodetection means for reducing transient temperature changes at said detector means upon introduction of a sample vessel into a prewarming compartment.

13. The instrument of claim 1 wherein temperature-sensitive, logarithm-taking elements of an absorbance photometer are mounted within the instrumentation housing.

14. The instrument of claim 12 wherein said thermally diffusive means for said prewarming compartments comprises an inner wall member of the housing which is integrally formed therewith.

15. The instrument of claim 5 wherein said housing body is formed of wall members having a thickness of about one-quarter inch.

16. A temperature stabilized photometric instrument for kinetic analysis comprising;
- a housing having a body which includes a surface member and a plurality of wall members which are integrally formed with said surface member and which extend in a generally perpendicular direction therefrom;
- said wall members arranged to separate the body into instrumentation and measuring compartments;
- a closure member for said body;
- said body formed of a material having a coefficient of thermal conductivity greater than about 0.1 calorie-centimeter/second-centimeter$^2$-centigrade degree and having a thermal capacity which substantially diffuses thermal transients from newly introduced samples;
- said measuring compartment wall members arranged for receiving and supporting a vessel containing a sample for analysis and for transmitting through said measuring compartments into said instrumentation compartment, a light beam which is projected at a wall member of said body;
- a photometric light source positioned outside of said body for projecting a light beam at said measuring compartment;
- photometric detection means positioned in said instrumentation compartment for sensing variations in a light absorbance characteristic of a sample material contained in a vessel and positioned in said measuring compartment; and,
- heat control means for establishing the temperature of said housing at a predetermined temperature and for automatically supplying heat to said housing for maintaining said established temperature.

17. The photometric instrument of claim 16 wherein said wall members further define a plurality of preheating sample vessel compartments.

* * * * *